United States Patent
Elshafie et al.

(10) Patent No.: US 11,910,426 B2
(45) Date of Patent: Feb. 20, 2024

(54) INTERFERENCE MANAGEMENT FOR SIDELINK RELAYING

(71) Applicant: QUALCOMM Incorporated, San Diego, CA (US)

(72) Inventors: Ahmed Elshafie, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/467,128

(22) Filed: Sep. 3, 2021

(65) Prior Publication Data

US 2023/0070809 A1    Mar. 9, 2023

(51) Int. Cl.
*H04W 72/20*    (2023.01)
*H04W 72/542*    (2023.01)
*H04W 72/1263*    (2023.01)
*H04W 72/044*    (2023.01)
*H04W 88/04*    (2009.01)

(52) U.S. Cl.
CPC ....... *H04W 72/542* (2023.01); *H04W 72/044* (2013.01); *H04W 72/1263* (2013.01); *H04W 72/20* (2023.01); *H04W 88/04* (2013.01)

(58) Field of Classification Search
None
See application file for complete search history.

(56) References Cited

U.S. PATENT DOCUMENTS

| | | | |
|---|---|---|---|
| 2020/0099481 A1* | 3/2020 | Pan | H04L 1/1841 |
| 2020/0344708 A1* | 10/2020 | Liao | H04W 72/02 |
| 2020/0389257 A1* | 12/2020 | Kung | H04W 4/06 |
| 2021/0021536 A1* | 1/2021 | Ganesan | H04L 1/1893 |
| 2021/0250131 A1* | 8/2021 | Fan | H04L 5/003 |
| 2021/0337509 A1* | 10/2021 | Selvanesan | H04W 72/0446 |
| 2022/0224454 A1* | 7/2022 | Yu | H04L 1/1835 |
| 2022/0330038 A1* | 10/2022 | Ganesan | H04W 52/10 |
| 2022/0416950 A1* | 12/2022 | Xu | H04L 1/1896 |
| 2023/0171036 A1* | 6/2023 | Selvanesan | H04L 1/1671 370/315 |
| 2023/0180098 A1* | 6/2023 | Harounabadi | H04W 40/24 370/315 |

\* cited by examiner

*Primary Examiner* — Kodzovi Acolatse
(74) *Attorney, Agent, or Firm* — Holland & Hart LLP

(57) ABSTRACT

Methods, systems, and devices for wireless communications are described. For instance, a first wireless device may transmit a first transmission of a transport block to a user equipment (UE). The UE may decode the received transport block and may receive control signaling indicating that a second wireless device is to transmit a second transmission of the transport block based on decoding the transport block. The UE may perform interference cancellation for the second transmission of the transport block from the second wireless device based on receiving the control signaling and may receive a third transmission based on performing the interference cancellation, where a first resource of the second transmission overlaps in time, frequency, or both with a second resource of the third transmission.

29 Claims, 12 Drawing Sheets

INTERFERENCE MANAGEMENT FOR SIDELINK RELAYING

FIELD OF TECHNOLOGY

The following relates to wireless communications, including interference management for sidelink relaying.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support interference management for sidelink relaying. Generally, the described techniques provide for a user equipment (UE) to perform interference cancellation for a transport block that the UE has already received. For instance, a first wireless device may transmit a first transmission of a transport block to a user equipment (UE). The UE may decode the received transport block and may receive control signaling indicating that a second wireless device is to transmit a second transmission of the transport block based on decoding the transport block. The UE may perform interference cancellation for the second transmission of the transport block from the second wireless device based on receiving the control signaling and may receive a third transmission based on performing the interference cancellation, where a first resource of the second transmission overlaps in time, frequency, or both with a second resource of the third transmission.

A method for wireless communication at a user equipment (UE) is described. The method may include receiving, from a first wireless device, a first transmission of a transport block, decoding the received transport block, receiving control signaling indicating that a second wireless device is to transmit a second transmission of the transport block based on decoding the transport block, performing interference cancellation for the second transmission of the transport block from the second wireless device based on receiving the control signaling, and receiving a third transmission based on performing the interference cancellation, where a first resource of the second transmission overlaps in time, frequency, or both with a second resource of the third transmission.

An apparatus for wireless communication at a UE is described. The apparatus may include a processor, memory coupled with the processor, and instructions stored in the memory. The instructions may be executable by the processor to cause the apparatus to receive, from a first wireless device, a first transmission of a transport block, decode the received transport block, receive control signaling indicating that a second wireless device is to transmit a second transmission of the transport block based on decoding the transport block, perform interference cancellation for the second transmission of the transport block from the second wireless device based on receiving the control signaling, and receive a third transmission based on performing the interference cancellation, where a first resource of the second transmission overlaps in time, frequency, or both with a second resource of the third transmission.

Another apparatus for wireless communication at a UE is described. The apparatus may include means for receiving, from a first wireless device, a first transmission of a transport block, means for decoding the received transport block, means for receiving control signaling indicating that a second wireless device is to transmit a second transmission of the transport block based on decoding the transport block, means for performing interference cancellation for the second transmission of the transport block from the second wireless device based on receiving the control signaling, and means for receiving a third transmission based on performing the interference cancellation, where a first resource of the second transmission overlaps in time, frequency, or both with a second resource of the third transmission.

A non-transitory computer-readable medium storing code for wireless communication at a UE is described. The code may include instructions executable by a processor to receive, from a first wireless device, a first transmission of a transport block, decode the received transport block, receive control signaling indicating that a second wireless device is to transmit a second transmission of the transport block based on decoding the transport block, perform interference cancellation for the second transmission of the transport block from the second wireless device based on receiving the control signaling, and receive a third transmission based on performing the interference cancellation, where a first resource of the second transmission overlaps in time, frequency, or both with a second resource of the third transmission.

In some examples of the method, apparatuses, and non-transitory computer-readable medium described herein, receiving the control signaling indicating that the second wireless device may be to transmit the second transmission of the transport block may include operations, features, means, or instructions for receiving the control signaling indicating that the second transmission of the transport block may be associated with a same link identifier as the first transmission of the transport block, where performing interference cancellation may be based on the second transmission being associated with the same link identifier as the first transmission.

In some examples of the method, apparatuses, and non-transitory computer-readable medium described herein, receiving the control signaling indicating that the second wireless device may be to transmit the second transmission of the transport block may include operations, features, means, or instructions for receiving the control signaling indicating that the second transmission of the transport block may be associated with a same source identifier, a same destination identifier, a same feedback process identifier, or any combination thereof, as the first transmission of the transport block, where performing interference cancellation may be based on the second transmission being associated with the same source identifier, destination identifier, feedback process identifier, or any combination thereof, as the first transmission.

In some examples of the method, apparatuses, and non-transitory computer-readable medium described herein, receiving the control signaling indicating that the second wireless device may be to transmit the second transmission of the transport block may include operations, features, means, or instructions for receiving the control signaling indicating a second value of the counter for the second transmission of the transport block where performing the interference cancellation may be based on the first value of the counter and the second value of the counter.

In some examples of the method, apparatuses, and non-transitory computer-readable medium described herein, performing the interference cancellation may include operations, features, means, or instructions for performing the interference cancellation based on the link identifier being associated with a maximum number of transport blocks below a threshold number of transport blocks.

In some examples of the method, apparatuses, and non-transitory computer-readable medium described herein, receiving the control signaling indicating that the second wireless device may be to transmit the second transmission of the transport block may include operations, features, means, or instructions for receiving the control signaling indicating that the second transmission of the transport block may be associated with a same mapping between a sidelink shared channel and a sidelink feedback channel as the first transmission of the transport block, where performing interference cancellation may be based on the second transmission being associated with the same mapping as the first transmission.

In some examples of the method, apparatuses, and non-transitory computer-readable medium described herein, the second transmission of the transport block and the first transmission of the transport block having the same mapping may be based on the second transmission of the transport block and the first transmission of the transport block being associated with a same link identifier, a same value of a counter, or both.

In some examples of the method, apparatuses, and non-transitory computer-readable medium described herein, receiving the third transmission may include operations, features, means, or instructions for receiving, from the first wireless device, the third transmission of a second transport block.

In some examples of the method, apparatuses, and non-transitory computer-readable medium described herein, the control signaling includes second-stage sidelink control information.

In some examples of the method, apparatuses, and non-transitory computer-readable medium described herein, the first wireless device includes a second UE and the second wireless device includes a third UE.

DETAILED DESCRIPTION

A user equipment (UE) may relay a received packet (e.g. a received transport block (TB)) to another UE. In examples in which multiple UEs are relaying packets, a first of the multiple UEs may receive a first TB from a second UE that the first UE already received from a third UE. If the first UE is receiving a second TB (e.g., previously unreceived by the first UE) while receiving the first TB from the second UE, the first TB from the second UE may interfere with the second TB. Accordingly, the first UE may be less likely to successfully receive and decode the second TB.

The methods described herein may enable the first UE to perform interference cancellation in order to cancel out and/or mitigate interference from a duplicate TB (e.g., a TB that the first UE has already received). For instance, control signaling (e.g., sidelink control information (SCI)) that schedules the duplicate TB from the second UE may include information that informs the first UE that the first UE is to receive the duplicate TB. In some examples, the SCI may include a link identifier (ID), which may be an ID indicating that a first transmission of the original TB (e.g., from the third UE) and a second transmission of the duplicate TB (e.g., from the second UE) are associated with a same routing path. Additionally or alternatively, the SCI may include a source ID, a destination ID, a feedback process ID (e.g., a hybrid automatic repeat request (HARQ) ID), a hop counter value, a mapping between a sidelink shared channel (e.g., a physical sidelink shared channel (PSSCH) and a feedback channel (e.g., a physical sidelink feedback channel (PFSCH)), or any combination thereof. Accordingly, the first UE may determine that the first UE is to receive the duplicate TB based on the link ID, the source ID, the destination ID, the feedback process ID, the mapping, or any combination thereof. Additionally or alternatively, the first UE may determine that the first UE is to receive a duplicate TB based on identifying that a number of TBs transmitted with a predefined duration and associated with a single link ID may be limited.

Aspects of the disclosure are initially described in the context of wireless communications systems. Additional aspects of the disclosure are described in the context of a mapping and a process flow. Aspects of the disclosure are further illustrated by and described with reference to apparatus diagrams, system diagrams, and flowcharts that relate to interference management for sidelink relaying.

Figure 1:
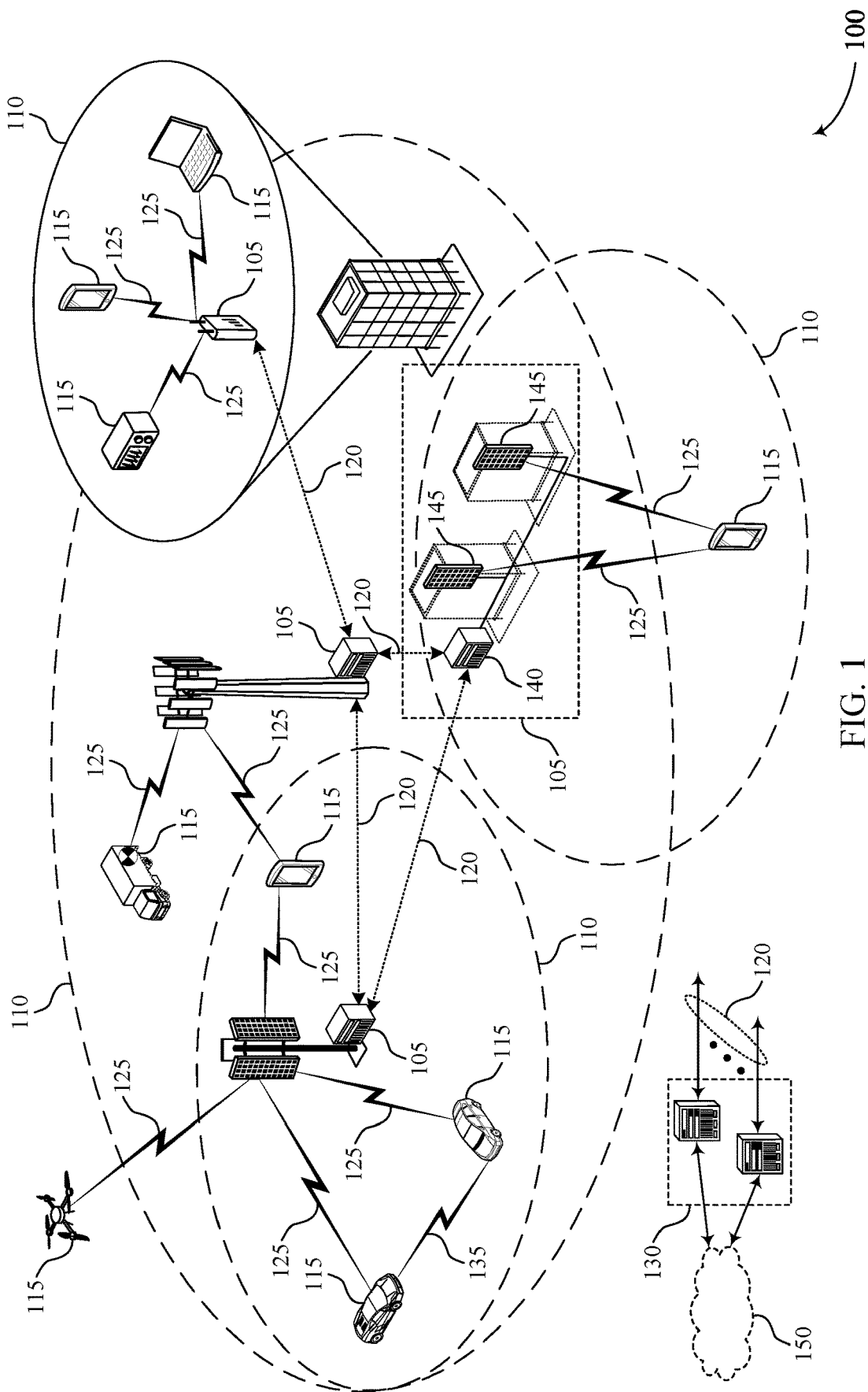
FIG. 1 illustrates an example of a wireless communications system that supports interference management for sidelink relaying in accordance with aspects of the present disclosure.

FIG. 1 illustrates an example of a wireless communications system 100 that supports interference management for sidelink relaying in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, relaying may occur between UEs 115. For instance, a base station 105 may use broadcast and/or groupcast to set up a multi-hop tunnel (e.g., via UE relays) in one or more dedicated time-frequency resources. The number of hops may be restricted (e.g., to one remote UE 115 and one relay UE 115). In some examples, each UE 115 may have a direct link to the base station 105 and one other UE 115 but not other UEs 115. In other examples, UEs 115 may have direct links to each other regardless of the hop number. In other examples, UEs 115 may be grouped into groups where each group may communicate with the next group (e.g., a single hop may occur from a group to another group).

In a first coverage scenario, multiple UE 115 may be in-coverage with a base station 105. In some such examples, sidelink UEs 115 may be connected to the base station 105 via a link and sidelink authorization and provisioning may occur via the link to support sidelink operation. In some such examples, the base station 105 may control sidelink discover and/or sidelink communication resource allocation. In a second coverage scenario, multiple UEs 115 may be out of coverage with a base station 105. In some such examples, the UEs 115 may not have a link with the base station 105 and may operate without authorization and provisioning via a link with the bae station 105. In some such examples, the UEs 115 may have pre-configured sidelink provisioning information for discovery and/or communication support. In a third coverage scenario (e.g, partial coverage), one UE 115 may be connected with a base station 105 and other UEs 115 may not be connected with the base station. In some such examples, the one UE 115 may be connected with the base station via a link and the other UEs 115 may connect perform relay operation using the one UE 115 to communicate with the base station 105. Authorization and provisioning as well as pre-configured sidelink provisioning may be performed.

In some examples, UE to network relays (e.g., relay UEs 115 connected with a base station 105 and at least one UE 115) may support connectivity for remote UEs 115 to the network (e.g., to a base station 105) via a relay UE 115. In each scenario, the relay UE 115 may be within a coverage area 110 of the base station 105. In some such examples, 1-hop relays (e.g., relays that provide one hop for transmissions) and/or multi-hop relays may be supported. In a first coverage scenario, both the relay UE 115 and the remote UE 115 may be in-coverage. In a second coverage scenario, the relay UE 115 is in coverage and the remote UE 115 is out of coverage.

In some examples, UE to UE relays (e.g., relay UEs 115 connected with a first UE 115 and a second UE 115) may support connectivity of a remote UE 115 with another UE 115 via a relay UE 115. In some such examples, 1-hop relays (e.g., relays that provide one hop for transmissions) and/or multi-hop relays may be supported. In a first coverage scenario, the relay UE 115 may be in-coverage of a base station 105 and the remote UE 115 may be in-coverage or out-of-coverage of the base station 105. In some such examples, the relay UE 115 may be controlled by the base station 105 for UE-to-UE relay routing and operation. In other examples, the relay UE 115 may be out-of-coverage of the base station 105 and the remote UE 115 may be in-coverage or out-of-coverage of the base station 105. In some such examples, the relay UE 115 may manage routing decisions.

In some examples, UEs 115 may perform one or more types of communication with each other. For instance, a UE 115 may transmit a broadcast transmission, in which one UE 115 broadcasts transmits a transmission to multiple UEs 115 (e.g., each user of a service). UEs 115 performing broadcasting may perform blind retransmissions (e.g., without feedback) and may use a predefined destination ID per service. Additionally or alternatively, a UE 115 may transmit a groupcast transmission, in which a UE 115 sends a transmission to multiple UEs 115 with a same group ID. UEs 115 performing groupcasting may perform acknowledgement (ACK) and/or negative acknowledgement (NACK) based retransmissions (e.g., according to HARQ feedback) and destination IDs may be configured (e.g., via an application server) or pre-configured. Additionally or alternatively, a UE 115 may transmit a unicast transmission, in which the UE transmits a transmission to one UE 115 and may involve link setup and maintenance. UEs 115 transmitting unicast transmissions may perform ACK and/or NACK based retransmissions (e.g., according to HARQ feedback) and destination IDs may be configured (e.g., via an application server), pre-configured, or discovered through a discovery procedure.

In some examples, a relay UE 115 may relay transmissions to and from other wireless devices. For instance, the relay UE 115 (e.g., a UE to network relay) may relay transmissions to and from a smartwatch (e.g., a smartwatch that may or may not have a 5G modem) or a health monitoring device connected to a smartphone (e.g., using sidelink communications). Additionally or alternatively, the relay UE 115 (e.g., a UE to network relay) may relay transmissions to and from an extended reality (XR) head-mounted display (HMD) (e.g., using sidelink communications). Additionally or alternatively, the relay UE 115 (e.g., a UE to network relay or a UE to UE relay) may relay transmissions to and from sensors (e.g., smart home appliances, such as a smart thermostat or an entry key or a mesh) communicating with the relay UE 115 or communicating among themselves.

In some examples, the described techniques provide for a UE 115 to perform interference cancellation for a transport block that the UE 115 has already received. For instance, a first wireless device may transmit a first transmission of a transport block to a UE 115. The UE 115 may decode the received transport block and may receive control signaling indicating that a second wireless device is to transmit a second transmission of the transport block based on decoding the transport block. The UE 115 may perform interference cancellation for the second transmission of the transport block from the second wireless device based on receiving the control signaling and may receive a third transmission based on performing the interference cancellation, where a first resource of the second transmission overlaps in time, frequency, or both with a second resource of the third transmission.

Figure 2:
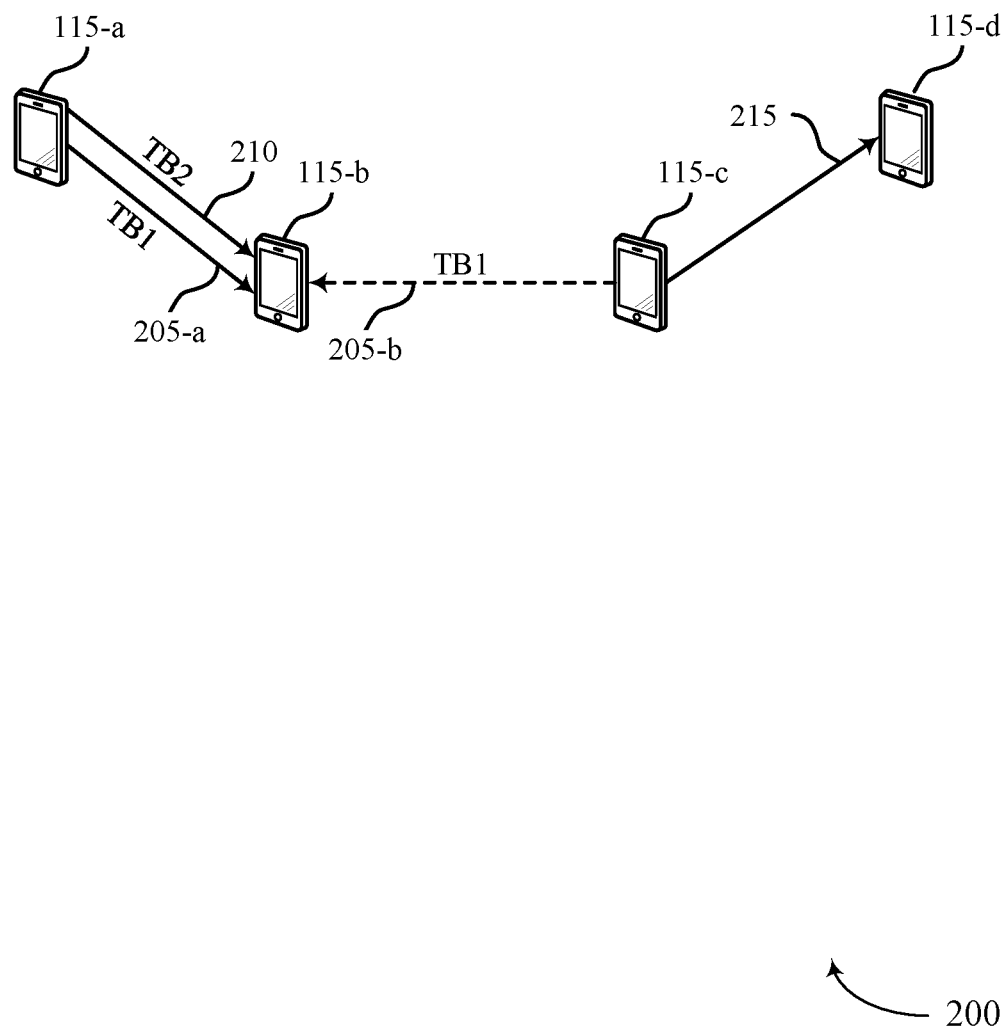
FIG. 2 illustrates an example of a wireless communications system that supports interference management for sidelink relaying in accordance with aspects of the present disclosure.

FIG. 2 illustrates an example of a wireless communications system 200 that supports interference management for sidelink relaying in accordance with aspects of the present disclosure. In some examples, wireless communications system 200 may implement one or more aspects of wireless communications system 100. For instance, UEs 115-a, 115-b, 115-c, and 115-d may be examples of UEs 115 as described with reference to FIG. 1.

UE 115-a may communicate with UE 115-b via sidelink communications, UE 115-b may communicate with UE 115-c via sidelink communications, and UE 115-c may communicate with UE 115-d via sidelink communications. In some examples, UE 115-a may be an example of a source UE 115 (e.g., a UE 115 that has generated packets and/or TBs to transmit to other UEs 115) and may transmit one or more TBs to a destination UE 115. For instance, UE 115-a may transmit a first TB (i.e., TB1) 205-a and a second TB (i.e., TB2) 210 to UE 115-b. In some examples, each transmission may occur on a same resource.

In one scenario, TB1 may be transmitted by a second hop transmitter (e.g., UE 115-c transmitting TB1 205-b, which may be a duplicate version of TB1 205-a) while TB2 is being transmitted at a previous hop or one of the previous hops. If the UE 115-b determines a log-likelihood ratio (LLR) of TB1 205-b and/or was able to decode it (e.g., due to relaying TB1 previously), UE 115-b may perform a cancellation method to remove interference from TB1 205-b (e.g., which may act as cross-link interference (CLI)). The present disclosure may describe methods that enable UE 115-b to identify interference from TB1 205-b while receiving TB2 210 (e.g., by identifying the source of TB1 205-b).

In some examples, TB2 210 may be a packet directed to a same destination UE 115 or a different one. However, the methods described herein may be applied if TB1 205-b is relayed by a UE 115 (e.g., UE 115-b) attempting to cancel TB1 205-b while receiving TB2 210. UEs 115 may identify that they have relayed a packet and may reduce interference of that packet and/or TB on their own data reception or reception of another packet and/or TB based on the identifying. The present disclosure proposes techniques that enable a UE 115 to use previously processed TBs to further cancel interference from UEs 115 transmitting the same TBs. The present disclosure may describe methods to track and uniquely identify each TB (e.g., locally or within a network) to assist in interference cancellation.

In some examples, UE 115-b may perform interference cancellation over sidelink based on a previously received TB (e.g., TB1 205-a). For instance, UE 115-b may decode TB1 205-a from its source (e.g., UE 115-a) and may determine that TB1 205-b is transmitted from another relay UE 115 (e.g., UE 115-c) to a destination UE on a time-frequency resource, where the transmission of TB1 205-*b* may cause interference to UE 115-*b* on the same time-frequency resource. UE 115-*b* may cancel the interference caused by the transmission of TB1 205-*b* from the other relay UE 115 (e.g., UE 115-*c*) based on the previously decoded TB1 205-*a* and may receive a second transmission (e.g., TB2 210) on the time-frequency resource based on the interference cancellation. In some examples, UE 115-*b* may relay TB1 to UE 115-*c* or UE 115-*c* may receive TB1 from another UE 115 (e.g., UE 115-*a* and/or UE 115-*d*). Additionally or alternatively, the second transmission that UE 115-*b* receives may be a TB or another type of transmission (e.g., any transmission that UE 115-*b* may receive on the same time-frequency resource).

In some examples, UE 115-*b* may use a link ID (e.g., routing ID) generated for each source-relays-destination. The link ID may be identified y each relay UE 115 involved in relaying packets from a source UE 115 to a final destination UE 115 (e.g., the last UE 115 to receive a packet). Each relay UE 115 may add its own ID (e.g., a source ID) and a destination ID (e.g., the ID of the UE 115 to receive the packet) and may also attach the link ID. The link ID may be used for each transmission from a source UE 115 to a destination UE 115 through a set of relays. In some examples, a base station 105 may assign link IDs for each path to ensure IDs do not repeat. Additionally or alternatively, in addition to transmitting source IDs and destination IDs for a relay UE 115, each relay UE 115 may include an original source ID (e.g., an ID of the original source UE 115 generating a transmission), an original destination ID (e.g., an ID of the original destination UE 115 to receive a transmission), a link ID, or any combination thereof, in first-stage SCI (SCI-1) or second-stage SCI (SCI-2) of a transmission. In some examples, UEs 115 ay use multiple IDs to point to a particular TB. In some examples, a relay UE 115 may use a same HARQ process to transmit a TB as the relay UE 115 uses to receive a same TB. Accordingly, the relay UE 115 may use a same feedback process ID (e.g., HARQ ID) when receiving and transmitting. Accordingly, in some examples, a relay UE 115 may indicate a source ID, a link ID, a destination ID, a HARQ ID, or any combination thereof, to establish a unique ID for each TB. In some examples, the identification of a TB may occur using coordination between UEs 115 and may establish a connection between transmissions in different hops.

In some examples, a hop counter may be added to a packet and a receiving UE 115 may use the link ID of the packet and the hope counter value of the packet to determine whether interference is from a previously received and/or decoded TB. When a source UE 115 sends the packet, the counter may be set to 0, and when the first hop relay UEs 115 forward the packet, the first hop relay UEs 115 may add 1 (e.g., the counter may be set to 1). When second hop relay UEs 115 forward the packet, the second hop relay UEs 115 may add 1 (e.g., the counter may be set to 2). The hop value counter may be used regardless of how many TBs may be associated with a same link ID and the counter may be signaled in SCI-1 or SCI-2.

In some examples, when UE 115-*b* is receiving TB2 210, UE 115-*c* may transmit TB2 210 on a same resource. In some such examples, the link ID may be unique and set by a base station 105. For the case of reserved resources where a source UE (e.g., UE 115-*a*) may reserve a set of resources to be used for relaying using a link ID, each UE 115 may identify time and/or frequency allocation of transmissions. In some examples, UE 115-*b* may leverage this identification using a source-relay ID (e.g., link ID) to determine whether a received SCI and/or PSSCH if for a TB that UE 115-*b* has decoded and/or maintained an LLR buffer for before. For instance, if there are 2 TBs per a source-relay ID pair, then once UE 115-*b* determines that a received transmission is using the source-relay ID pair, then UE 115-*b* may determine that UE 115-*b* has received a duplicate TB. Accordingly, if the number of relayed TBs per relay ID (e.g., link ID) is limited (e.g., to be 2 maximum) at a relaying cycle defined by X transmissions, slots, or time units, UE 115-*b* may determine based on the link ID whether or not UE 115-*b* is to receive a duplicate TB. In some examples, X may be a time or duration limitation of a UE 115 during which the UE 115 maintains a TB in a buffer of the UE 115. In some examples, the UE may store Y TBs in the buffer at a given time.

If X TBs are relayed for a same source UE 115 and/or destination UE 115 in a consecutive manner (e.g., while UE 115-*b* is receiving TB2 210, UE 115-*c* is transmitting TB1 205-*b* on the same resource), then for half-duplex relay UEs 115 under the reserved resources, the half-duplex relay UE 115 may blindly decode and/or cancel the TB1 205-*b* transmission. For full-duplex relay UEs 115, a link ID may enable the full-duplex relay UE 115 to determine whether an interfering TB is one forwarded earlier to a next hop. In some such examples, the full-duplex relay UE 115 (e.g., UE 115-*b*) may decode a first SCI (e.g., SCI-1) and ma determine that it is to receive TB1 205-*b* by identifying a same link ID (e.g., relay ID) for TB1 205-*b* as for TB1 205-*a* as well as that two instances of TB1 are transmitted, and may accordingly cancel TB1 205-*b*.

In some examples, a mapping between PSSCH and a physical sidelink feedback channel (PSFCH) resource may be determined based on a starting sub-channel of the PSSCH, a slot containing the PSSCH, a source ID, and a destination ID. However, according to the methods described herein, the mapping may be determined, additionally or alternatively, according to a link ID and/or a hop counter. If the link ID is used to map a PSSCH resource to s PSFCH resource, then when multiple TBs are relayed on different nodes, the feedback PSFCH may be sent of different RBs. Additionally or alternatively, adding the counter to define the mapping may reduce interference between PSFCH when associated with the same PSSCH resource and same link ID. In some examples, the number of available PSFCH resources may be equal to or greater than a number of UEs in a groupcast group as described herein. An example of a mapping may be described herein, for instance, with reference to FIG. 3.

In some examples, the methods described may be associated with one or more advantages. For instance, a full-duplex UE 115 may transmit data and receive data on partially or fully overlapped resources. If the full-duplex UE 115 observes that a TB received on a resource overlaps with a TB already relayed by the full-duplex UE 115 (e.g., or for which the full-duplex UE 115 has LLRs), the full-duplex UE 115 may perform successful cancellation.

Figure 3:
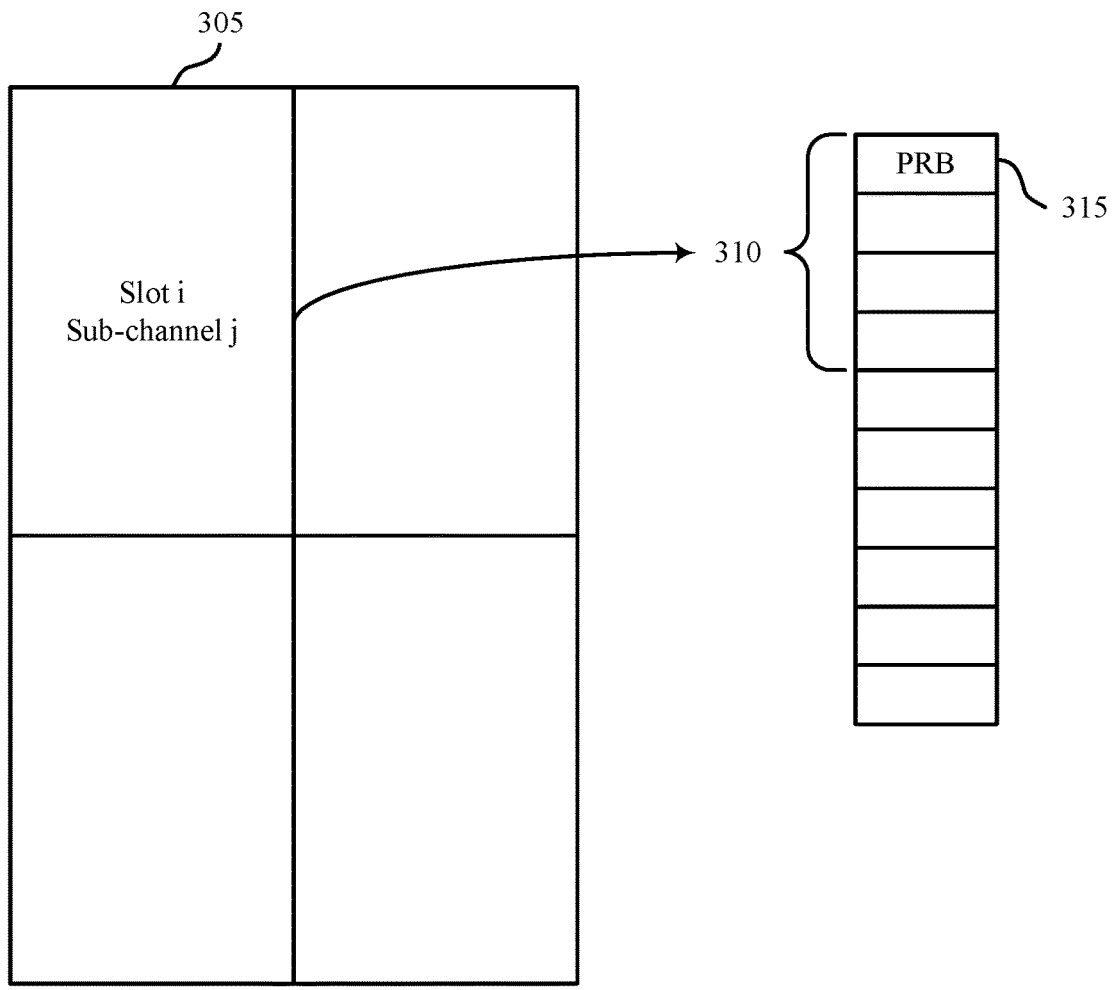
FIG. 3 illustrates an example of a mapping that supports interference management for sidelink relaying in accordance with aspects of the present disclosure.

FIG. 3 illustrates an example of a mapping 300 that supports interference management for sidelink relaying in accordance with aspects of the present disclosure. In some examples, mapping 300 may be an example of a PSSCH to PSFCH mapping as described herein.

A UE 115 (e.g., a relay UE 115) may identify a PSSCH resource 305 associated with a slot i (e.g., of slots 0 through I) and of sub-channel j (e.g., of sub-channels 0 through J). The UE 115 may map the PSSCH resource 305 to a PSFCH resource 310 for conveying feedback, where the PSFCH resource may include one or more physical resource blocks (PRBs) (e.g., 4 PRBs). In the present disclosure, the UE 115 may determine the PSFCH resource based on a link ID and/or hop counter for a TB to be communicated on the PSSCH resource 305. For instance, TBs associated with different link IDs and/or different hop counters may be associated with a same PSSCH resource 305, but may be associated with different PSFCH resources 310.

Figure 4:
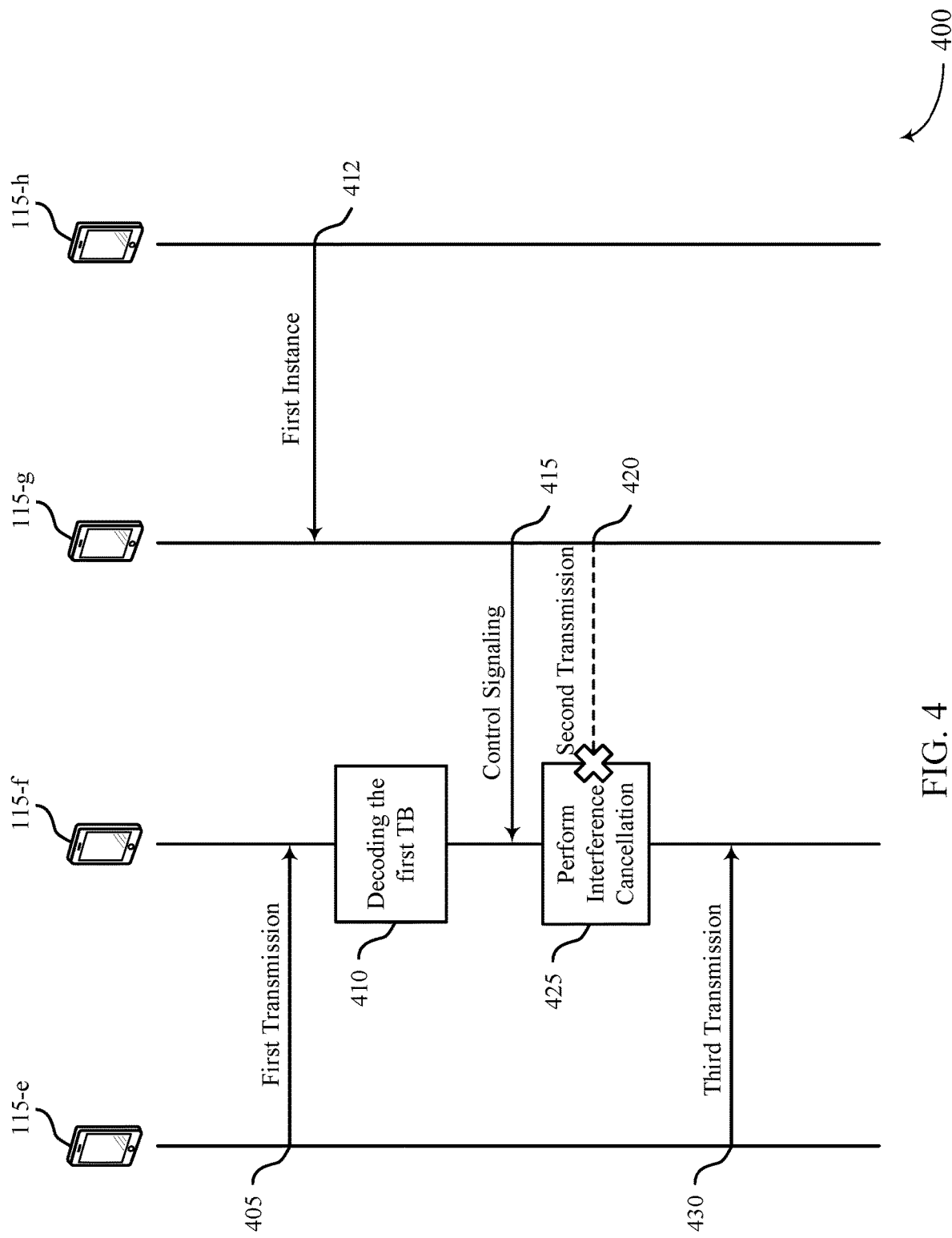
FIG. 4 illustrates an example of a process flow that supports interference management for sidelink relaying in accordance with aspects of the present disclosure.

FIG. 4 illustrates an example of a process flow 400 that supports interference management for sidelink relaying in accordance with aspects of the present disclosure. In some examples, process flow 400 may be implemented by one or more aspects of wireless communications system 200. For instance, UEs 115-*e*, 115-*f*, 115-*g*, and 115-*h* may each be an example of a UE 115 as described with reference to FIG. 1. It should be noted that that another wireless device (e.g., a smart watch, a health monitoring device, an HMD, a sensor, a base station 105) may perform the methods of UEs 115-*e* and/or 115-*g* without deviating from the scope of the present disclosure.

At 405, UE 115-*e* may transmit, to UE 115-*f*, a first transmission of a TB. In some examples, the first transmission of the TB may be associated with a first value of a counter.

At 410, UE 115-*f* may decode the received first TB.

At 412, UE 115-*h* may transmit, to UE 115-*g*, a first instance of a TB (e.g., the same TB as transmitted at 405). UE 115-*g* may receive the first instance of the TB according to a feedback process identifier (e.g., a HARQ ID).

At 415, UE 115-*g* may transmit control signaling indicating that UE 115-*g* is to transmit a second transmission of the TB (e.g., the TB transmitted at 405, 412, or both). In some examples, the control signaling may indicate, to UE 115-*f*, that UE 115-*g* is to transmit the second transmission of the TB based on decoding the first TB. Alternatively, another UE 115 (e.g., UE 115-*e*) may transmit the control signaling. In some examples, the control signaling may indicate that the second transmission of the TB is associated with a same link ID as the first transmission of the TB. In some examples, the control signaling may indicate that the second transmission of the TB is associated with a same source ID, a same destination ID, a same feedback process ID (e.g., HARQ ID), or any combination thereof, as the first transmission of the TB. In some examples, the control signaling may indicate a second value of the counter for the second transmission of the TB. In some examples, the control signaling may indicate that the second transmission of the TB is associated with a same mapping between a sidelink shared channel (e.g., PSSCH) and a sidelink feedback channel (e.g., PSFCH) as the first transmission of the TB. In some examples, the control signaling may include second-stage SCI. In some examples, the control signaling may indicate the feedback process identifier used to receive the TB at 412.

At 420, UE 115-*g* may transmit the second transmission (e.g., a second instance) of the TB. In some examples, UE 115-*g* may transmit the second instance of the TB according to the same feedback process identifier (e.g., HARQ ID) as used to receive the first instance of the TB at 412.

At 425, UE 115-*f* may perform interference cancellation for the second transmission of the TB from UE 115-*g* based on receiving the control signaling. In some examples, performing interference cancellation is based on the second transmission being associated with the same link identifier as the first transmission. In some examples, performing interference cancellation is based on the second transmission being associated with the same source ID, destination ID, feedback process ID, or any combination thereof, as the first transmission. In some examples, performing the interference cancellation is based on the first value of the counter and the second value of the counter. In some examples, performing the interference cancellation is based on the link ID being associated with a maximum number of TBs being below a threshold number of TBs. In some examples, performing the interference cancellation is based on the second transmission being associated with the same mapping as the first transmission. In some examples, the second transmission of the TB and the first transmission of the TB having the same mapping may be based on the second transmission of the TB and the first transmission of the TB being associated with a same link ID, a same value of a counter, or both.

At 430, UE 115-*e* may transmit a third transmission, where UE 115-*f* may receive the third transmission based on performing the interference cancellation. In some such examples, a first resource of the second transmission of the TB may overlap in time, frequency, or both, with a second resource of the third transmission. In some examples, the third transmission may be of a second TB.

Figure 5:
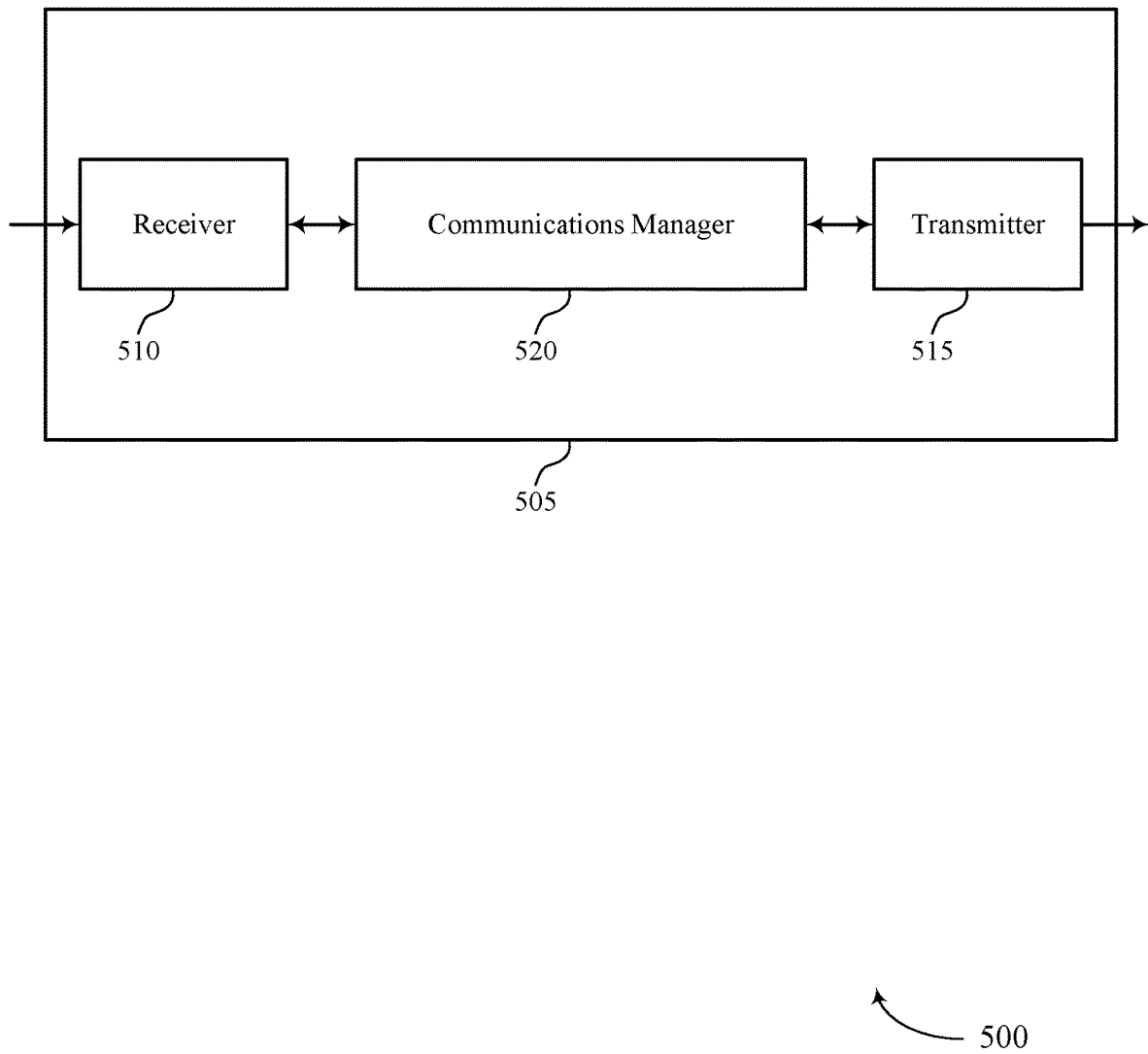
FIGS. 5 and 6 show block diagrams of devices that support interference management for sidelink relaying in accordance with aspects of the present disclosure.

FIG. 5 shows a block diagram 500 of a device 505 that supports interference management for sidelink relaying in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to interference management for sidelink relaying). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to interference management for sidelink relaying). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of interference management for sidelink relaying as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a first wireless device, a first transmission of a transport block. The communications manager 520 may be configured as or otherwise support a means for decoding the received transport block. The communications manager 520 may be configured as or otherwise support a means for receiving control signaling indicating that a second wireless device is to transmit a second transmission of the transport block based on decoding the transport block. The communications manager 520 may be configured as or otherwise support a means for performing interference cancellation for the second transmission of the transport block from the second wireless device based on receiving the control signaling. The communications manager 520 may be configured as or otherwise support a means for receiving a third transmission based on performing the interference cancellation, where a first resource of the second transmission overlaps in time, frequency, or both with a second resource of the third transmission.

The communications manager 520 may be configured as or otherwise support a means for receiving, from a second wireless device, a first instance of a transport block according to a feedback process identifier. The communications manager 520 may be configured as or otherwise support a means for transmitting, to a UE, control signaling indicating that the first wireless device is to transmit a second instance of the transport block, where the control signaling indicates the feedback process identifier. The communications manager 520 may be configured as or otherwise support a means for transmitting, to the UE, the second instance of the transport block according to the feedback process identifier.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for the device 505 to perform interference cancellation to reduce interference from a transmission of a transport block that the device 505 has already received. Reducing interference may enable the device 505 to be more likely in being successful in receiving and decoding another transmission, such as another transport block that the device 505 has not yet received. Accordingly, the efficiency of communications may increase according to the techniques described herein.

Figure 6:
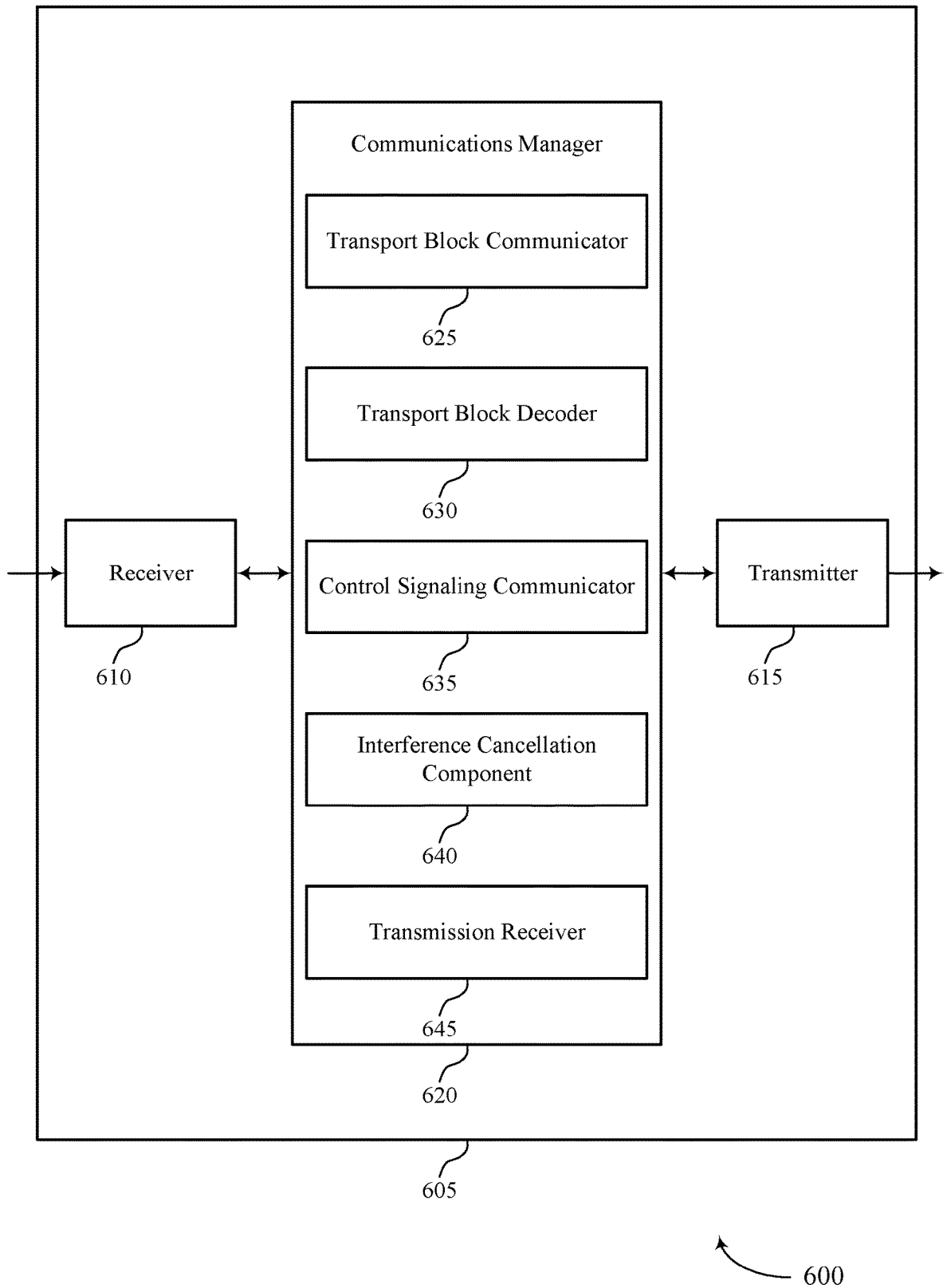

FIG. 6 shows a block diagram 600 of a device 605 that supports interference management for sidelink relaying in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to interference management for sidelink relaying). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to interference management for sidelink relaying). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of interference management for sidelink relaying as described herein. For example, the communications manager 620 may include a transport block communicator 625, a transport block decoder 630, a control signaling communicator 635, an interference cancellation component 640, a transmission receiver 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The transport block communicator 625 may be configured as or otherwise support a means for receiving, from a first wireless device, a first transmission of a transport block. The transport block decoder 630 may be configured as or otherwise support a means for decoding the received transport block. The control signaling communicator 635 may be configured as or otherwise support a means for receiving control signaling indicating that a second wireless device is to transmit a second transmission of the transport block based on decoding the transport block. The interference cancellation component 640 may be configured as or otherwise support a means for performing interference cancellation for the second transmission of the transport block from the second wireless device based on receiving the control signaling. The transmission receiver 645 may be configured as or otherwise support a means for receiving a third transmission based on performing the interference cancellation, where a first resource of the second transmission overlaps in time, frequency, or both with a second resource of the third transmission.

The transport block communicator 625 may be configured as or otherwise support a means for receiving, from a second wireless device, a first instance of a transport block according to a feedback process identifier. The control signaling communicator 635 may be configured as or otherwise support a means for transmitting, to a UE, control signaling indicating that the first wireless device is to transmit a second instance of the transport block, where the control signaling indicates the feedback process identifier. The transport block communicator 625 may be configured as or otherwise support a means for transmitting, to the UE, the second instance of the transport block according to the feedback process identifier.

Figure 7:
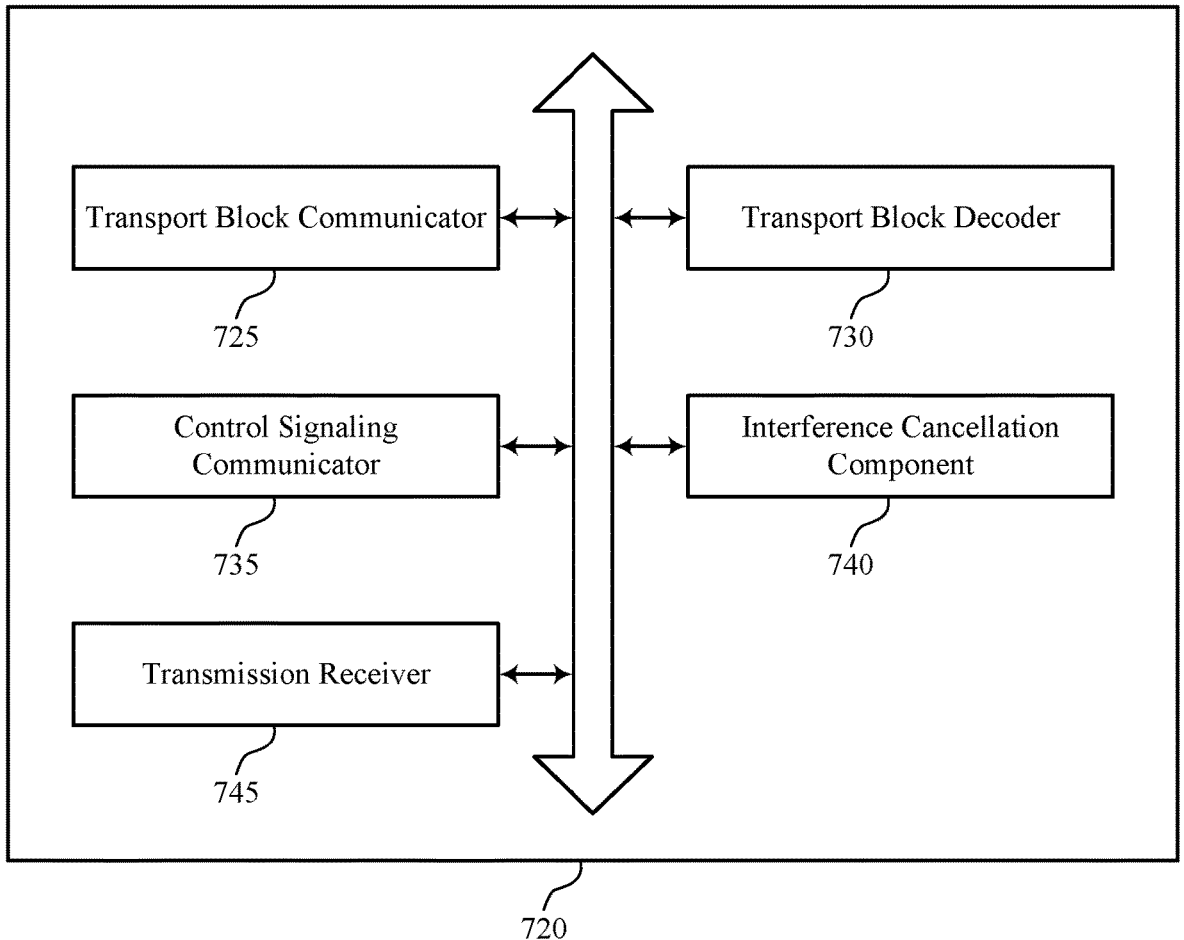
FIG. 7 shows a block diagram of a communications manager that supports interference management for sidelink relaying in accordance with aspects of the present disclosure.

FIG. 7 shows a block diagram 700 of a communications manager 720 that supports interference management for sidelink relaying in accordance with aspects of the present disclosure. The communications manager 720 may be an example of aspects of a communications manager 520, a communications manager 620, or both, as described herein. The communications manager 720, or various components thereof, may be an example of means for performing various aspects of interference management for sidelink relaying as described herein. For example, the communications manager 720 may include a transport block communicator 725, a transport block decoder 730, a control signaling communicator 735, an interference cancellation component 740, a transmission receiver 745, or any combination thereof. Each of these components may communicate, directly or indirectly, with one another (e.g., via one or more buses).

The communications manager 720 may support wireless communication at a UE in accordance with examples as disclosed herein. The transport block communicator 725 may be configured as or otherwise support a means for receiving, from a first wireless device, a first transmission of a transport block. The transport block decoder 730 may be configured as or otherwise support a means for decoding the received transport block. The control signaling communicator 735 may be configured as or otherwise support a means for receiving control signaling indicating that a second wireless device is to transmit a second transmission of the transport block based on decoding the transport block. The interference cancellation component 740 may be configured as or otherwise support a means for performing interference cancellation for the second transmission of the transport block from the second wireless device based on receiving the control signaling. The transmission receiver 745 may be configured as or otherwise support a means for receiving a third transmission based on performing the interference cancellation, where a first resource of the second transmission overlaps in time, frequency, or both with a second resource of the third transmission.

In some examples, to support receiving the control signaling indicating that the second wireless device is to transmit the second transmission of the transport block, the control signaling communicator 735 may be configured as or otherwise support a means for receiving the control signaling indicating that the second transmission of the transport block is associated with a same link identifier as the first transmission of the transport block, where performing interference cancellation is based on the second transmission being associated with the same link identifier as the first transmission.

In some examples, to support receiving the control signaling indicating that the second wireless device is to transmit the second transmission of the transport block, the control signaling communicator 735 may be configured as or otherwise support a means for receiving the control signaling indicating that the second transmission of the transport block is associated with a same source identifier, a same destination identifier, a same feedback process identifier, or any combination thereof, as the first transmission of the transport block, where performing interference cancellation is based on the second transmission being associated with the same source identifier, destination identifier, feedback process identifier, or any combination thereof, as the first transmission.

In some examples, the first transmission of the transport block is associated with a first value of a counter. In some examples, to support receiving the control signaling indicating that the second wireless device is to transmit the second transmission of the transport block, the control signaling communicator 735 may be configured as or otherwise support a means for receiving the control signaling indicating a second value of the counter for the second transmission of the transport block where performing the interference cancellation is based on the first value of the counter and the second value of the counter.

In some examples, to support performing the interference cancellation, the interference cancellation component 740 may be configured as or otherwise support a means for performing the interference cancellation based on the link identifier being associated with a maximum number of transport blocks below a threshold number of transport blocks.

In some examples, to support receiving the control signaling indicating that the second wireless device is to transmit the second transmission of the transport block, the control signaling communicator 735 may be configured as or otherwise support a means for receiving the control signaling indicating that the second transmission of the transport block is associated with a same mapping between a sidelink shared channel and a sidelink feedback channel as the first transmission of the transport block, where performing interference cancellation is based on the second transmission being associated with the same mapping as the first transmission.

In some examples, the second transmission of the transport block and the first transmission of the transport block having the same mapping is based on the second transmission of the transport block and the first transmission of the transport block being associated with a same link identifier, a same value of a counter, or both.

In some examples, to support receiving the third transmission, the transmission receiver 745 may be configured as or otherwise support a means for receiving, from the first wireless device, the third transmission of a second transport block.

In some examples, the control signaling includes second-stage sidelink control information.

In some examples, the first wireless device includes a second UE and the second wireless device includes a third UE.

The transport block communicator 725 may be configured as or otherwise support a means for receiving, from a second wireless device, a first instance of a transport block according to a feedback process identifier. The control signaling communicator 735 may be configured as or otherwise support a means for transmitting, to a UE, control signaling indicating that the first wireless device is to transmit a second instance of the transport block, where the control signaling indicates the feedback process identifier. The transport block communicator 725 may be configured as or otherwise support a means for transmitting, to the UE, the second instance of the transport block according to the feedback process identifier.

Figure 8:
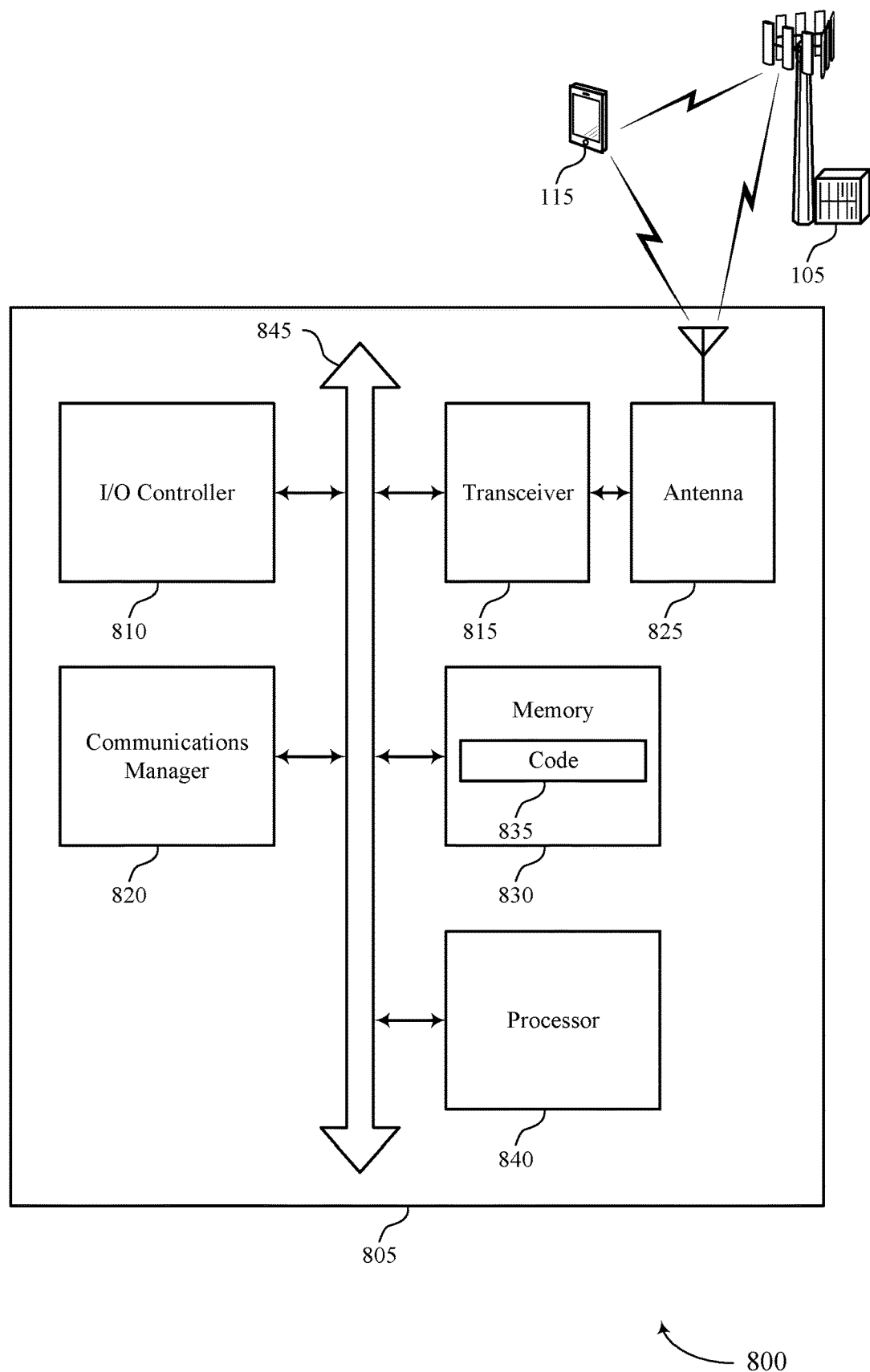
FIG. 8 shows a diagram of a system including a device that supports interference management for sidelink relaying in accordance with aspects of the present disclosure.

FIG. 8 shows a diagram of a system 800 including a device 805 that supports interference management for sidelink relaying in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting interference management for sidelink relaying). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a first wireless device, a first transmission of a transport block. The communications manager 820 may be configured as or otherwise support a means for decoding the received transport block. The communications manager 820 may be configured as or otherwise support a means for receiving control signaling indicating that a second wireless device is to transmit a second transmission of the transport block based on decoding the transport block. The communications manager 820 may be configured as or otherwise support a means for performing interference cancellation for the second transmission of the transport block from the second wireless device based on receiving the control signaling. The communications manager 820 may be configured as or otherwise support a means for receiving a third transmission based on performing the interference cancellation, where a first resource of the second transmission overlaps in time, frequency, or both with a second resource of the third transmission.

By including or configuring the communications manager 820 in accordance with examples as described herein, the device 805 may support techniques for the device 805 to perform interference cancellation to reduce interference from a transmission of a transport block that the device 805 has already received. Reducing interference may enable the device 805 to be more likely in being successful in receiving and decoding another transmission, such as another transport block that the device 805 has not yet received. Accordingly, the efficiency of communications may increase according to the techniques described herein.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of interference management for sidelink relaying as described herein, or the processor 840 and the memory 830 may be otherwise configured to perform or support such operations.

The communications manager 820 may be configured as or otherwise support a means for receiving, from a second wireless device, a first instance of a transport block according to a feedback process identifier. The communications manager 820 may be configured as or otherwise support a means for transmitting, to a UE, control signaling indicating that the first wireless device is to transmit a second instance of the transport block, where the control signaling indicates the feedback process identifier. The communications manager 820 may be configured as or otherwise support a means for transmitting, to the UE, the second instance of the transport block according to the feedback process identifier.

Figure 9:
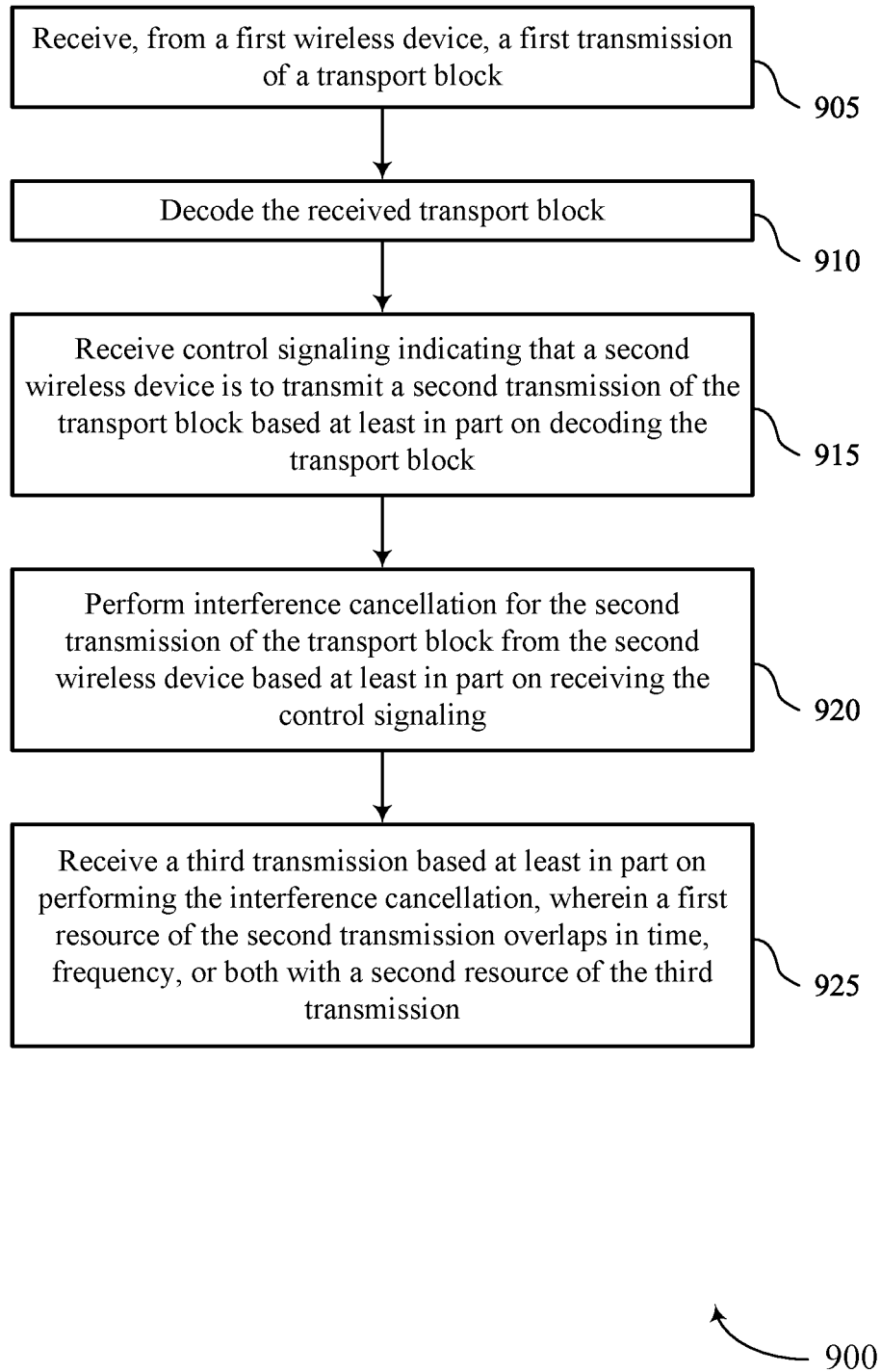
FIGS. 9 through 12 show flowcharts illustrating methods that support interference management for sidelink relaying in accordance with aspects of the present disclosure.

FIG. 9 shows a flowchart illustrating a method 900 that supports interference management for sidelink relaying in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a first wireless device, a first transmission of a transport block. The operations of 905 may be performed in accordance with examples as disclosed herein. In some examples, aspects of the operations of 905 may be performed by a transport block communicator 725 as described with reference to FIG. 7.

At 910, the method may include decoding the received transport block. The operations of 910 may be performed in accordance with examples as disclosed herein. In some examples, aspects of the operations of 910 may be performed by a transport block decoder 730 as described with reference to FIG. 7.

At 915, the method may include receiving control signaling indicating that a second wireless device is to transmit a second transmission of the transport block based on decoding the transport block. The operations of 915 may be performed in accordance with examples as disclosed herein. In some examples, aspects of the operations of 915 may be performed by a control signaling communicator 735 as described with reference to FIG. 7.

At 920, the method may include performing interference cancellation for the second transmission of the transport block from the second wireless device based on receiving the control signaling. The operations of 920 may be performed in accordance with examples as disclosed herein. In some examples, aspects of the operations of 920 may be performed by an interference cancellation component 740 as described with reference to FIG. 7.

At 925, the method may include receiving a third transmission based on performing the interference cancellation, where a first resource of the second transmission overlaps in time, frequency, or both with a second resource of the third transmission. The operations of 925 may be performed in accordance with examples as disclosed herein. In some examples, aspects of the operations of 925 may be performed by a transmission receiver 745 as described with reference to FIG. 7.

Figure 10:
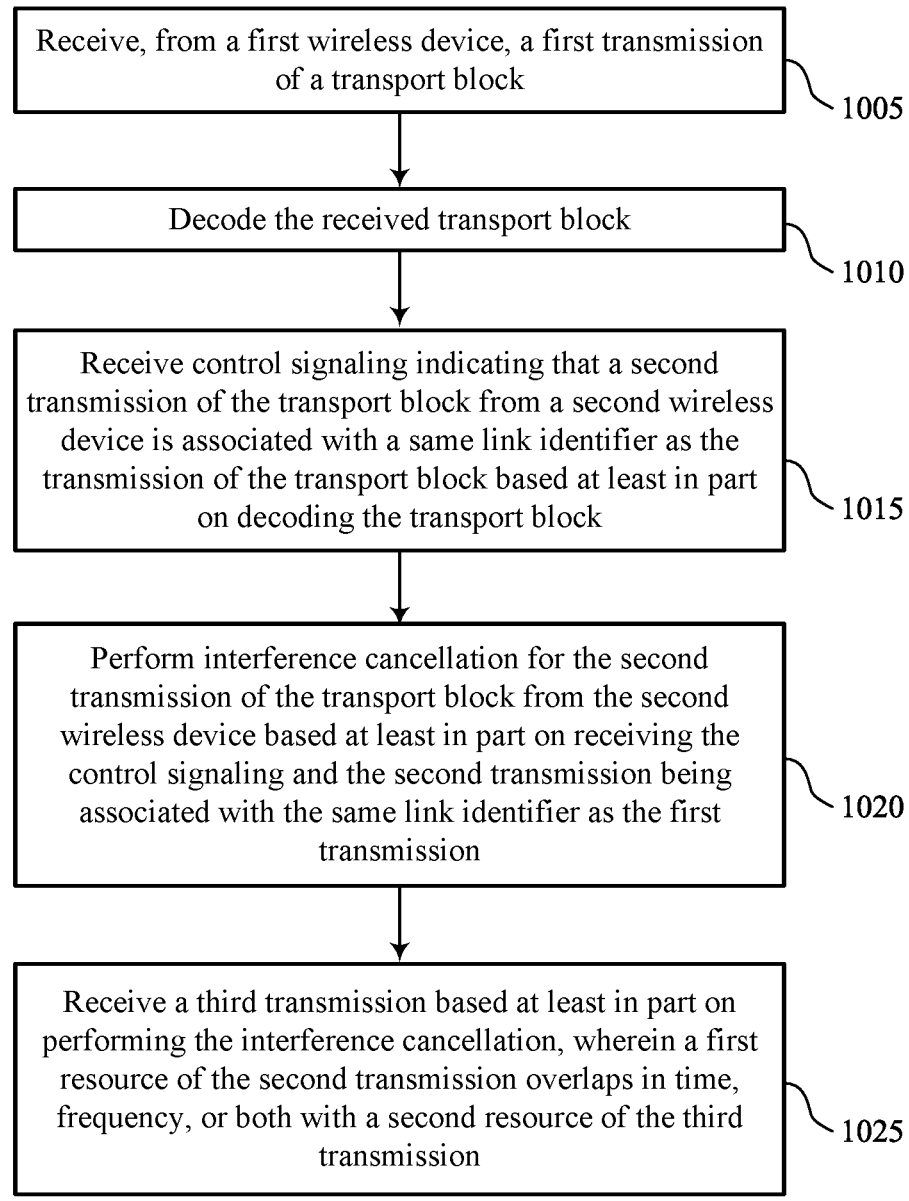

FIG. 10 shows a flowchart illustrating a method 1000 that supports interference management for sidelink relaying in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a first wireless device, a first transmission of a transport block. The operations of 1005 may be performed in accordance with examples as disclosed herein. In some examples, aspects of the operations of 1005 may be performed by a transport block communicator 725 as described with reference to FIG. 7.

At 1010, the method may include decoding the received transport block. The operations of 1010 may be performed in accordance with examples as disclosed herein. In some examples, aspects of the operations of 1010 may be performed by a transport block decoder 730 as described with reference to FIG. 7.

At 1015, the method may include receiving control signaling indicating that a second transmission of the transport block from a second wireless device is associated with a same link identifier as the first transmission of the transport block based at least in part on decoding the transport block. The operations of 1015 may be performed in accordance with examples as disclosed herein. In some examples, aspects of the operations of 1015 may be performed by a control signaling communicator 735 as described with reference to FIG. 7.

At 1020, the method may include performing interference cancellation for the second transmission of the transport block from the second wireless device based at least in part on receiving the control signaling and the second transmission being associated with the same link identifier as the first transmission. The operations of 1020 may be performed in accordance with examples as disclosed herein. In some examples, aspects of the operations of 1020 may be performed by an interference cancellation component 740 as described with reference to FIG. 7.

At 1025, the method may include receiving a third transmission based on performing the interference cancellation, where a first resource of the second transmission overlaps in time, frequency, or both with a second resource of the third transmission. The operations of 1025 may be performed in accordance with examples as disclosed herein. In some examples, aspects of the operations of 1025 may be performed by a transmission receiver 745 as described with reference to FIG. 7.

Figure 11:
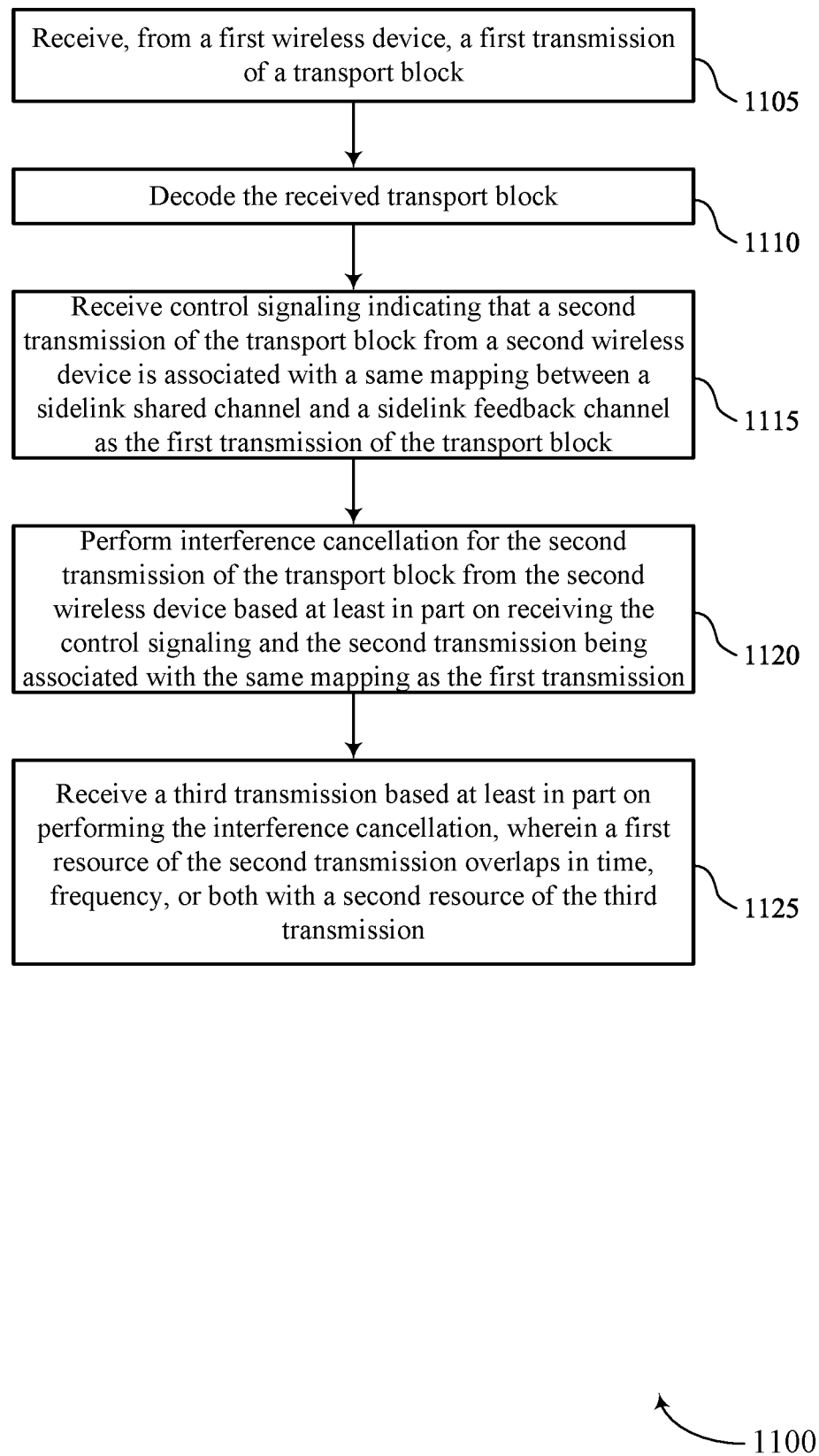

FIG. 11 shows a flowchart illustrating a method 1100 that supports interference management for sidelink relaying in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a first wireless device, a first transmission of a transport block. The operations of 1105 may be performed in accordance with examples as disclosed herein. In some examples, aspects of the operations of 1105 may be performed by a transport block communicator 725 as described with reference to FIG. 7.

At 1110, the method may include decoding the received transport block. The operations of 1110 may be performed in accordance with examples as disclosed herein. In some examples, aspects of the operations of 1110 may be performed by a transport block decoder 730 as described with reference to FIG. 7.

At 1115, the method may include receiving control signaling indicating that a second transmission of the transport block from a second wireless device is associated with a same mapping between a sidelink shared channel and a sidelink feedback channel as the first transmission of the transport block. The operations of 1115 may be performed in accordance with examples as disclosed herein. In some examples, aspects of the operations of 1115 may be performed by a control signaling communicator 735 as described with reference to FIG. 7.

At 1120, the method may include performing interference cancellation for the second transmission of the transport block from the second wireless device based at least in part on receiving the control signaling and the second transmission being associated with the same mapping as the first transmission. The operations of 1120 may be performed in accordance with examples as disclosed herein. In some examples, aspects of the operations of 1120 may be performed by an interference cancellation component 740 as described with reference to FIG. 7.

At 1125, the method may include receiving a third transmission based on performing the interference cancellation, where a first resource of the second transmission overlaps in time, frequency, or both with a second resource of the third transmission. The operations of 1125 may be performed in accordance with examples as disclosed herein. In some examples, aspects of the operations of 1125 may be performed by a transmission receiver 745 as described with reference to FIG. 7.

Figure 12:
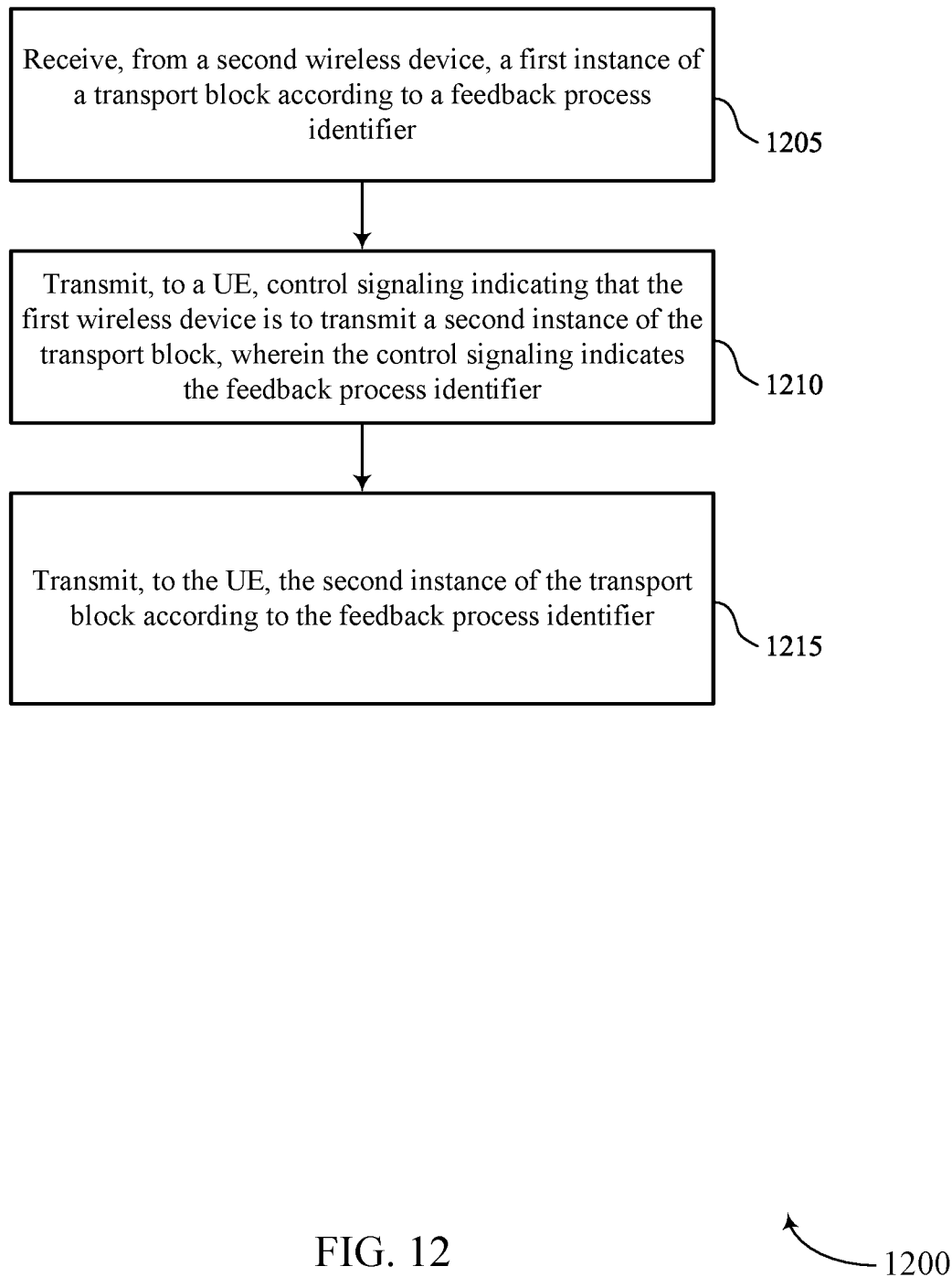

FIG. 12 shows a flowchart illustrating a method 1200 that supports interference management for sidelink relaying in accordance with aspects of the present disclosure. The operations of the method 1200 may be implemented by a first wireless device (e.g., a UE, a base station) or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, from a second wireless device, a first instance of a transport block according to a feedback process identifier. The operations of 1205 may be performed in accordance with examples as disclosed herein. In some examples, aspects of the operations of 1205 may be performed by a transport block communicator 725 as described with reference to FIG. 7.

At 1210, the method may include transmitting, to a UE, control signaling indicating that the first wireless device is to transmit a second instance of the transport block, wherein the control signaling indicates the feedback process identifier. The operations of 1210 may be performed in accordance with examples as disclosed herein. In some examples, aspects of the operations of 1210 may be performed by a control signaling communicator 735 as described with reference to FIG. 7.

At 1215, the method may include transmitting, to the UE, the second instance of the transport block according to the feedback process identifier. The operations of 1215 may be performed in accordance with examples as disclosed herein. In some examples, aspects of the operations of 1215 may be performed by a transport block communicator 725 as described with reference to FIG. 7.

The following provides an overview of aspects of the present disclosure:

Aspect 1: A method for wireless communication at a UE, comprising: receiving, from a first wireless device, a first transmission of a transport block; decoding the received transport block; receiving control signaling indicating that a second wireless device is to transmit a second transmission of the transport block based at least in part on decoding the transport block; and performing interference cancellation for the second transmission of the transport block from the second wireless device based at least in part on receiving the control signaling; and receiving a third transmission based at least in part on performing the interference cancellation, wherein a first resource of the second transmission overlaps in time, frequency, or both with a second resource of the third transmission.

Aspect 2: The method of aspect 1, wherein receiving the control signaling indicating that the second wireless device is to transmit the second transmission of the transport block comprises: receiving the control signaling indicating that the second transmission of the transport block is associated with a same link identifier as the first transmission of the transport block, wherein performing interference cancellation is based at least in part on the second transmission being associated with the same link identifier as the first transmission.

Aspect 3: The method of aspect 2, wherein receiving the control signaling indicating that the second wireless device is to transmit the second transmission of the transport block comprises: receiving the control signaling indicating that the second transmission of the transport block is associated with a same source identifier, a same destination identifier, a same feedback process identifier, or any combination thereof, as the first transmission of the transport block, wherein performing interference cancellation is based at least in part on the second transmission being associated with the same source identifier, destination identifier, feedback process identifier, or any combination thereof, as the first transmission.

Aspect 4: The method of any of aspects 2 through 3, wherein the first transmission of the transport block is associated with a first value of a counter, and wherein receiving the control signaling indicating that the second wireless device is to transmit the second transmission of the transport block comprises: receiving the control signaling indicating a second value of the counter for the second transmission of the transport block wherein performing the interference cancellation is based at least in part on the first value of the counter and the second value of the counter.

Aspect 5: The method of any of aspects 2 through 4, wherein performing the interference cancellation comprises: performing the interference cancellation based at least in part on the link identifier being associated with a maximum number of transport blocks below a threshold number of transport blocks.

Aspect 6: The method of any of aspects 1 through 5, wherein receiving the control signaling indicating that the second wireless device is to transmit the second transmission of the transport block comprises: receiving the control signaling indicating that the second transmission of the transport block is associated with a same mapping between a sidelink shared channel and a sidelink feedback channel as the first transmission of the transport block, wherein performing interference cancellation is based at least in part on the second transmission being associated with the same mapping as the first transmission.

Aspect 7: The method of aspect 6, wherein the second transmission of the transport block and the first transmission of the transport block having the same mapping is based at least in part on the second transmission of the transport block and the first transmission of the transport block being associated with a same link identifier, a same value of a counter, or both.

Aspect 8: The method of any of aspects 1 through 7, wherein receiving the third transmission comprises: receiving, from the first wireless device, the third transmission of a second transport block.

Aspect 9: The method of any of aspects 1 through 8, wherein the control signaling comprises second-stage sidelink control information.

Aspect 10: The method of any of aspects 1 through 9, wherein the first wireless device comprises a second UE and the second wireless device comprises a third UE.

Aspect 11: An apparatus for wireless communication at a UE, comprising a processor; memory coupled with the processor; and instructions stored in the memory and executable by the processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a first wireless device, a first transmission of a transport block;
   decoding the received transport block;
   receiving control signaling indicating that a second wireless device is to transmit a second transmission of the transport block based at least in part on decoding the transport block;
   performing interference cancellation for the second transmission of the transport block from the second wireless device based at least in part on receiving the control signaling; and
   receiving a third transmission based at least in part on performing the interference cancellation, wherein a first resource of the second transmission overlaps in time, frequency, or both with a second resource of the third transmission.

2. The method of claim 1, wherein receiving the control signaling indicating that the second wireless device is to transmit the second transmission of the transport block comprises:
   receiving the control signaling indicating that the second transmission of the transport block is associated with a same link identifier as the first transmission of the transport block, wherein performing interference cancellation is based at least in part on the second transmission being associated with the same link identifier as the first transmission.

3. The method of claim 2, wherein receiving the control signaling indicating that the second wireless device is to transmit the second transmission of the transport block comprises:
   receiving the control signaling indicating that the second transmission of the transport block is associated with a same source identifier, a same destination identifier, a same feedback process identifier, or any combination thereof, as the first transmission of the transport block, wherein performing interference cancellation is based at least in part on the second transmission being associated with the same source identifier, destination identifier, feedback process identifier, or any combination thereof, as the first transmission.

4. The method of claim 2, wherein the first transmission of the transport block is associated with a first value of a counter, and wherein receiving the control signaling indicating that the second wireless device is to transmit the second transmission of the transport block comprises:
   receiving the control signaling indicating a second value of the counter for the second transmission of the transport block wherein performing the interference cancellation is based at least in part on the first value of the counter and the second value of the counter.

5. The method of claim 2, wherein performing the interference cancellation comprises:
   performing the interference cancellation based at least in part on a link identifier being associated with a maximum number of transport blocks below a threshold number of transport blocks.

6. The method of claim 1, wherein receiving the control signaling indicating that the second wireless device is to transmit the second transmission of the transport block comprises:
   receiving the control signaling indicating that the second transmission of the transport block is associated with a same mapping between a sidelink shared channel and a sidelink feedback channel as the first transmission of the transport block, wherein performing interference cancellation is based at least in part on the second transmission being associated with the same mapping as the first transmission.

7. The method of claim 6, wherein the second transmission of the transport block and the first transmission of the transport block having the same mapping is based at least in part on the second transmission of the transport block and the first transmission of the transport block being associated with a same link identifier, a same value of a counter, or both.

8. The method of claim 1, wherein receiving the third transmission comprises:
   receiving, from the first wireless device, the third transmission of a second transport block.

9. The method of claim 1, wherein the control signaling comprises second-stage sidelink control information.

10. The method of claim 1, wherein the first wireless device comprises a second UE and the second wireless device comprises a third UE.

11. An apparatus for wireless communication at a user equipment (UE), comprising:
one or more processors; and
instructions stored in one or more memories and executable by the one or more processors, individually or collectively, to cause the apparatus to:
receive, from a first wireless device, a first transmission of a transport block;
decode the received transport block;
receive control signaling indicating that a second wireless device is to transmit a second transmission of the transport block based at least in part on decoding the transport block;
perform interference cancellation for the second transmission of the transport block from the second wireless device based at least in part on receiving the control signaling; and
receive a third transmission based at least in part on performing the interference cancellation, wherein a first resource of the second transmission overlaps in time, frequency, or both with a second resource of the third transmission.

12. The apparatus of claim 11, wherein the instructions to receive the control signaling indicating that the second wireless device is to transmit the second transmission of the transport block are executable by the one or more processors, individually or collectively, to cause the apparatus to:
receive the control signaling indicating that the second transmission of the transport block is associated with a same link identifier as the first transmission of the transport block, wherein performing interference cancellation is based at least in part on the second transmission being associated with the same link identifier as the first transmission.

13. The apparatus of claim 12, wherein the instructions to receive the control signaling indicating that the second wireless device is to transmit the second transmission of the transport block are executable by the one or more processors, individually or collectively, to cause the apparatus to:
receive the control signaling indicating that the second transmission of the transport block is associated with a same source identifier, a same destination identifier, a same feedback process identifier, or any combination thereof, as the first transmission of the transport block, wherein performing interference cancellation is based at least in part on the second transmission being associated with the same source identifier, destination identifier, feedback process identifier, or any combination thereof, as the first transmission.

14. The apparatus of claim 12, wherein the first transmission of the transport block is associated with a first value of a counter, and wherein the instructions to receive the control signaling indicating that the second wireless device is to transmit the second transmission of the transport block are executable by the one or more processors, individually or collectively, to cause the apparatus to:
receive the control signaling indicating a second value of the counter for the second transmission of the transport block wherein performing the interference cancellation is based at least in part on the first value of the counter and the second value of the counter.

15. The apparatus of claim 12, wherein the instructions to perform the interference cancellation are executable by the one or more processors, individually or collectively, to cause the apparatus to:
perform the interference cancellation based at least in part on a link identifier being associated with a maximum number of transport blocks below a threshold number of transport blocks.

16. The apparatus of claim 11, wherein the instructions to receive the control signaling indicating that the second wireless device is to transmit the second transmission of the transport block are executable by the one or more processors, individually or collectively, to cause the apparatus to:
receive the control signaling indicating that the second transmission of the transport block is associated with a same mapping between a sidelink shared channel and a sidelink feedback channel as the first transmission of the transport block, wherein performing interference cancellation is based at least in part on the second transmission being associated with the same mapping as the first transmission.

17. The apparatus of claim 16, wherein the second transmission of the transport block and the first transmission of the transport block having the same mapping is based at least in part on the second transmission of the transport block and the first transmission of the transport block being associated with a same link identifier, a same value of a counter, or both.

18. The apparatus of claim 11, wherein the instructions to receive the third transmission are executable by the one or more processors, individually or collectively, to cause the apparatus to:
receive, from the first wireless device, the third transmission of a second transport block.

19. The apparatus of claim 11, wherein:
the control signaling comprises second-stage sidelink control information.

20. The apparatus of claim 11, wherein the first wireless device comprises a second UE and the second wireless device comprises a third UE.

21. An apparatus for wireless communication at a user equipment (UE), comprising:
means for receiving, from a first wireless device, a first transmission of a transport block;
means for decoding the received transport block;
means for receiving control signaling indicating that a second wireless device is to transmit a second transmission of the transport block based at least in part on decoding the transport block;
means for performing interference cancellation for the second transmission of the transport block from the second wireless device based at least in part on receiving the control signaling; and
means for receiving a third transmission based at least in part on performing the interference cancellation, wherein a first resource of the second transmission overlaps in time, frequency, or both with a second resource of the third transmission.

22. The apparatus of claim 21, wherein the means for receiving the control signaling indicating that the second wireless device is to transmit the second transmission of the transport block comprise:
means for receiving the control signaling indicating that the second transmission of the transport block is associated with a same link identifier as the first transmission of the transport block, wherein performing interference cancellation is based at least in part on the second transmission being associated with the same link identifier as the first transmission.

23. The apparatus of claim 22, wherein the means for receiving the control signaling indicating that the second wireless device is to transmit the second transmission of the transport block comprise:
means for receiving the control signaling indicating that the second transmission of the transport block is associated with a same source identifier, a same destination identifier, a same feedback process identifier, or any combination thereof, as the first transmission of the transport block, wherein performing interference cancellation is based at least in part on the second transmission being associated with the same source identifier, destination identifier, feedback process identifier, or any combination thereof, as the first transmission.

24. The apparatus of claim 22, wherein the first transmission of the transport block is associated with a first value of a counter, wherein the means for receiving the control signaling indicating that the second wireless device is to transmit the second transmission of the transport block comprise:
means for receiving the control signaling indicating a second value of the counter for the second transmission of the transport block wherein performing the interference cancellation is based at least in part on the first value of the counter and the second value of the counter.

25. The apparatus of claim 22, wherein the means for performing the interference cancellation comprise:
means for performing the interference cancellation based at least in part on a link identifier being associated with a maximum number of transport blocks below a threshold number of transport blocks.

26. The apparatus of claim 21, wherein the means for receiving the control signaling indicating that the second wireless device is to transmit the second transmission of the transport block comprise:
means for receiving the control signaling indicating that the second transmission of the transport block is associated with a same mapping between a sidelink shared channel and a sidelink feedback channel as the first transmission of the transport block, wherein performing interference cancellation is based at least in part on the second transmission being associated with the same mapping as the first transmission.

27. The apparatus of claim 26, wherein the second transmission of the transport block and the first transmission of the transport block having the same mapping is based at least in part on the second transmission of the transport block and the first transmission of the transport block being associated with a same link identifier, a same value of a counter, or both.

28. The apparatus of claim 21, wherein the means for receiving the third transmission comprise:
means for receiving, from the first wireless device, the third transmission of a second transport block.

29. The apparatus of claim 21, wherein:
the control signaling comprises second-stage sidelink control information.

* * * * *